United States Patent
Coffin et al.

(10) Patent No.: US 10,436,116 B2
(45) Date of Patent: *Oct. 8, 2019

(54) GAS TURBINE ENGINE GEARED ARCHITECTURE AXIAL RETENTION ARRANGEMENT

(71) Applicant: United Technologies Corporation, Farmington, CT (US)

(72) Inventors: James B. Coffin, Windsor, CT (US); Alessio Pescosolido, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 233 days.

This patent is subject to a terminal disclaimer.

(21) Appl. No.: 15/497,590

(22) Filed: Apr. 26, 2017

(65) Prior Publication Data

US 2017/0298828 A1 Oct. 19, 2017

Related U.S. Application Data

(63) Continuation of application No. 14/306,402, filed on Jun. 17, 2014, now Pat. No. 9,664,114, which is a
(Continued)

(51) Int. Cl.
*F02C 7/20* (2006.01)
*F01D 25/16* (2006.01)
(Continued)

(52) U.S. Cl.
CPC ............... *F02C 7/20* (2013.01); *B64D 27/26* (2013.01); *F01D 21/045* (2013.01); *F01D 25/16* (2013.01);
(Continued)

(58) Field of Classification Search
CPC .......... F02C 7/20; F01D 21/045; F01D 25/16; F01D 25/18; F01D 25/20; F04D 13/02; F04D 13/028; F04D 29/063
See application file for complete search history.

(56) References Cited

U.S. PATENT DOCUMENTS 2,258,792 A 4/1941 New
2,936,655 A 5/1960 Peterson et al.
(Continued)

FOREIGN PATENT DOCUMENTS

EP 0791383 8/1997
EP 1142850 10/2001
(Continued)

OTHER PUBLICATIONS

Honeywell LF507. Jane's Aero-engines, Aero-engines—Turbofan. Feb. 9, 2012.
(Continued)

*Primary Examiner* — Jason D Shanske
*Assistant Examiner* — Aye S Htay
(74) *Attorney, Agent, or Firm* — Carlson, Gaskey & Olds, P.C.

(57) ABSTRACT

A gas turbine engine includes a fan, an engine static structure, a geared architecture to drive the fan and supported relative to the static structure, a fan drive turbine to drive the geared architecture, a first member secured to the geared architecture, and a second member secured to the engine static structure and configured to cooperate with the first member to limit movement of the geared architecture relative to the static structure. A fan drive gear system and method are also disclosed.

21 Claims, 7 Drawing Sheets

Related U.S. Application Data continuation of application No. 13/435,353, filed on Mar. 30, 2012, now Pat. No. 8,790,075.

(51) Int. Cl.
 *F02C 7/36* (2006.01)
 *B64D 27/26* (2006.01)
 *F01D 21/04* (2006.01)

(52) U.S. Cl.
 CPC .......... *F02C 7/36* (2013.01); *B64D 2027/266* (2013.01); *F05D 2220/36* (2013.01); *F05D 2260/40311* (2013.01); *Y10T 29/49318* (2015.01)

(56) References Cited

U.S. PATENT DOCUMENTS

| | | | |
|---|---|---|---|
| 3,021,731 A | 2/1962 | Stoeckicht | |
| 3,194,487 A | 7/1965 | Tyler et al. | |
| 3,287,906 A | 11/1966 | McCormick | |
| 3,352,178 A | 11/1967 | Lindgren et al. | |
| 3,412,560 A | 11/1968 | Gaubatz | |
| 3,747,343 A | 7/1973 | Rosen | |
| 3,754,484 A | 8/1973 | Roberts | |
| 3,820,719 A | 6/1974 | Clark | |
| 3,892,358 A | 7/1975 | Gisslen | |
| 3,932,058 A | 1/1976 | Harner et al. | |
| 3,935,558 A | 1/1976 | Miller et al. | |
| 3,988,889 A | 11/1976 | Chamay et al. | |
| 4,130,872 A | 12/1978 | Harloff | |
| 4,284,174 A | 8/1981 | Salvana et al. | |
| 4,478,551 A | 10/1984 | Honeycutt, Jr. et al. | |
| 4,649,114 A | 3/1987 | Miltenburger et al. | |
| 4,696,156 A | 9/1987 | Burr et al. | |
| 4,979,362 A | 12/1990 | Vershure, Jr. | |
| 5,102,379 A | 4/1992 | Pagluica et al. | |
| 5,141,400 A | 8/1992 | Murphy et al. | |
| 5,317,877 A | 6/1994 | Stuart | |
| 5,433,674 A * | 7/1995 | Sheridan | F16H 1/2809 475/346 |
| 5,447,411 A | 9/1995 | Curley et al. | |
| 5,466,198 A | 11/1995 | McKibbin et al. | |
| 5,524,847 A | 6/1996 | Brodell et al. | |
| 5,677,060 A | 10/1997 | Terentieva et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 5,985,470 A | 11/1999 | Spitsberg et al. | |
| 6,183,388 B1 | 2/2001 | Hawkins | |
| 6,223,616 B1 | 5/2001 | Sheridan | |
| 6,315,815 B1 | 11/2001 | Spadaccini et al. | |
| 6,318,070 B1 | 11/2001 | Rey et al. | |
| 6,387,456 B1 | 5/2002 | Eaton, Jr. et al. | |
| 6,517,341 B1 | 2/2003 | Brun et al. | |
| 6,607,165 B1 | 8/2003 | Manteiga et al. | |
| 6,709,492 B1 | 3/2004 | Spadaccini et al. | |
| 6,814,541 B2 | 11/2004 | Evans et al. | |
| 7,021,042 B2 | 4/2006 | Law | |
| 7,223,197 B2 | 5/2007 | Poulin et al. | |
| 7,270,620 B2 * | 9/2007 | Tiesler | F16H 57/0479 475/159 |
| 7,328,580 B2 | 2/2008 | Lee et al. | |
| 7,374,403 B2 | 5/2008 | Decker et al. | |
| 7,591,754 B2 | 9/2009 | Duong et al. | |
| 7,621,843 B2 * | 11/2009 | Madge | F16H 1/2818 475/346 |
| 7,662,059 B2 | 2/2010 | McCune | |
| 7,694,505 B2 | 4/2010 | Schilling | |
| 7,806,651 B2 | 10/2010 | Kennepohl et al. | |
| 7,824,305 B2 | 11/2010 | Duong et al. | |
| 7,926,260 B2 | 4/2011 | Sheridan et al. | |
| 7,950,151 B2 | 5/2011 | Duong et al. | |
| 7,997,868 B1 | 8/2011 | Liang et al. | |
| 8,087,885 B2 | 1/2012 | Suciu et al. | |
| 8,205,432 B2 | 6/2012 | Sheridan | |
| 8,517,670 B1 * | 8/2013 | Coffin | F01D 25/16 415/122.1 |
| 8,790,075 B2 * | 7/2014 | Coffin | F01D 25/16 415/122.1 |
| 2008/0003096 A1 | 1/2008 | Kohli et al. | |
| 2008/0116009 A1 | 5/2008 | Sheridan et al. | |
| 2008/0317588 A1 | 12/2008 | Grabowski et al. | |
| 2009/0056343 A1 | 3/2009 | Suciu et al. | |
| 2009/0314881 A1 * | 12/2009 | Suciu | B64D 27/26 244/54 |
| 2010/0105516 A1 * | 4/2010 | Sheridan | F01D 25/18 475/346 |
| 2010/0148396 A1 | 6/2010 | Xie et al. | |
| 2010/0212281 A1 | 8/2010 | Sheridan | |
| 2010/0218483 A1 | 9/2010 | Smith | |
| 2010/0331139 A1 | 12/2010 | McCune | |
| 2011/0130246 A1 | 6/2011 | McCune et al. | |
| 2011/0159797 A1 | 6/2011 | Beltman et al. | |
| 2011/0286836 A1 | 11/2011 | Davis | |
| 2011/0293423 A1 | 12/2011 | Bunker et al. | |
| 2012/0124964 A1 | 5/2012 | Hasel et al. | |

FOREIGN PATENT DOCUMENTS

| | | |
|---|---|---|
| EP | 2339146 A1 | 6/2011 |
| GB | 1516041 | 6/1978 |
| GB | 2041090 | 9/1980 |
| GB | 2426792 | 12/2006 |
| WO | 2007038674 | 4/2007 |

OTHER PUBLICATIONS

Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978. pp. 1-420.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8). Start p. 32.

Hendricks, E.S. and Tong, M.T. (2012). Performance and weight estimates for an advanced open rotor engine. NASA/TM-2012-217710. pp. 1-13.

Guynn, M. D., Berton, J.J., Fisher, K. L, Haller, W.J., Tong, M. T., and Thurman, D.R. (2011). Refined exploration of turbofan design options for an advanced single-aisle transport. NASA/TM-2011-216883. pp. 1-27.

Zalud, T. (1998). Gears put a new spin on turbofan performance. Machine Design, 70(20), p. 104.

Kurzke, J. (2008). Preliminary Design, Aero-engine design: From state of the art turbofans towards innovative architectures. pp. 1-72.

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.

Han, J., Dutta, S., and Ekkad, S.V. (2000). Gas turbine heat transfer and cooling technology. New York, NY: Taylor & Francis. pp. 1-25, 129-157, and 160-249.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.

Declaration of Reza Abhari, Ph.D. In re U.S. Pat. No. 8,844,265. Executed Jun. 28, 2016. pp. 1-91.

Declaration of John Eaton, Ph.D. In re U.S. Pat. No. 8,869,568. Executed Mar. 28, 2016. pp. 1-87.

Declaration of Reza Abhari. In re U.S. Pat. No. 8,695,920. Executed Nov. 30. pp. 1-67.

Declaration of Reza Abhari. In re U.S. Pat. No. 8,448,895. Executed Nov. 28. pp. 1-81.

(56) References Cited

OTHER PUBLICATIONS

Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003.. p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compound& Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28 (9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76(1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.

Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Dxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press. pp. 215-219 and 855-860.
Bunker, R.S. (2005). A review of shaped hole turbine film-cooling technology. Journal of Heat Transfer vol. 127. Apr. 2005. pp. 441-453.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-151.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.G., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.

(56) References Cited

OTHER PUBLICATIONS

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. Ge Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

Gunston, B. (Ed.) (2000). Jane's aero-engines, Issue seven. Coulsdon, Surrey, UK: Jane's Information Group Limited. pp. 510-512.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Middleton, P. (1971). 614: VFW's jet feederliner. Flight International, Nov. 4, 1971. p. 725, 729-732.

Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.

Baker, R.W. (2000). Membrane technology and applications. New York, NY: McGraw-Hill. pp. 87-153.

Cheryan, M. (1998). Ultrafiltration and microfiltration handbook. Lancaster, PA: Tecnomic Publishing Company, Inc. pp. 171-236.

Seader, J.D. and Henley, E.J. (1998). Separation process principles. New York, NY: John Wiley & Sons, Inc. pp. 722-726 and 764-771.

Spadaccini, L.J., and Huang, H. (2002). On-line fuel deoxygenation for coke suppression. ASME, Jun. 2002. pp. 1-7.

Darrah, S. (1987). Jet fuel deoxygenation. Interim Report for Period Mar. 1987-Jul. 1988. pp. 1-22.

Bucknell, R.L. (1973). Influence of fuels and lubricants on turbine engine design and performance, fuel and lubricant analyses. Final Technical Report, Mar. 1971-Mar. 1973. pp. 1-252.

Hazlett, R.N. (1991). Thermal oxidation stability of aviation turbine fuels. Philadelphia, PA: ASTM. pp. 1-163.

Taylor, W.F. (1974). Deposit formation from deoxygenated hydrocarbons. I. General features. Ind. Eng. Chem., Prod. Res. Develop., vol. 13(2). 1974. pp. 133-138.

Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.

Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.

Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.

Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review_pdf.

(56) References Cited

OTHER PUBLICATIONS

Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_ptfe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.H. and Schairer, E.T. (1977). Analysis of turbofan propulsion system weight and dimensions. NASA Technical Memorandum. Jan. 1977. pp. 1-65.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Hieingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Gunston, Bill, "Jane's Aero-Engines," Issue Seven, Mar. 2000, pp. 510-512.
U.S. Appl. No. 13/362,389, filed Jan. 31, 2012, "Turbomachine Geared Architecture Support Assembly".
International Search Report & Written Opinion for International Application No. PCT/US13/33795 dated Jun. 5, 2014.
International Preliminary Report on Patentability for PCT Application No. PCT/US2013/033795, dated Oct. 9, 2014.
Supplementary European Search Report for EP Application No. 13812614.9 dated Nov. 12, 2015.
Written Opinion for Singapore Application No. 11201404966Q dated Oct. 14, 2015.

* cited by examiner

GAS TURBINE ENGINE GEARED ARCHITECTURE AXIAL RETENTION ARRANGEMENT

This application is a continuation application of U.S. patent application Ser. No. 14/306,402, filed on Jun. 17, 2014, which is a continuation application of U.S. patent application Ser. No. 13/435,353, filed on Mar. 30, 2012, now U.S. Pat. No. 8,790,075 granted on Jul. 29, 2014.

BACKGROUND

This disclosure relates to limiting axial movement of a geared architecture within a turbomachine during an extreme event.

Turbomachines, such as gas turbine engines, typically include a fan section, a turbine section, a compressor section, and a combustor section. Turbomachines may employ a geared architecture connecting the fan section and the turbine section.

Support structures are used to hold the geared architecture within the turbomachine. The support structures may be relatively compliant to accommodate some movement of the geared architecture relative to other portions of the turbomachine. Extreme engine events such as fan blade loss or failure of fan shaft bearing supports may encourage significant axial movement of the geared architecture and the fan, relative to other portions of the turbomachine. These movements are undesirable as is known. The relatively compliant support structures may not provide desired axial retention of the geared architecture during extreme engine events.

SUMMARY

A gas turbine engine according to an exemplary embodiment of this disclosure, among other possible things includes a fan, an engine static structure, a geared architecture to drive the fan and supported relative to the static structure, a fan drive turbine to drive the geared architecture, a first member secured to the geared architecture, and a second member secured to the engine static structure and configured to cooperate with the first member to limit movement of the geared architecture relative to the static structure.

In a further embodiment of any of the foregoing gas turbine engines, the first and second members are circumferentially aligned with one another and spaced apart from one another during a normal operating condition.

In a further embodiment of any of the foregoing gas turbine engines, the first and second members limit axial movement of the geared architecture relative to the engine static structure.

In a further embodiment of any of the foregoing gas turbine engines, includes a flex support supporting the geared architecture relative to the engine static structure.

In a further embodiment of any of the foregoing gas turbine engines, includes a support structure secured to the geared architecture and the flex support. The support structure includes at least one of a torque frame, a carrier, and a lubrication manifold, and the second member is removably secured to at least one of the torque frame, the carrier, and the lubrication manifold.

In a further embodiment at any of the foregoing gas turbine engines, the gas turbine engine has a bypass ratio greater than about six to one.

In a further embodiment of any of the foregoing gas turbine engines, the geared architecture has a gear reduction ratio greater than about 2.3:1.

In a further embodiment of any of the foregoing gas turbine engines, the geared architecture is a planetary gear train.

In a further embodiment of any of the foregoing gas turbine engines, the planetary gear train includes a plurality of gears supported within the carrier. The carrier is fixed against rotation by the torque frame. A central sun gear is operatively connected to the fan drive turbine. A ring gear is configured to drive the fan.

In a further embodiment of any of the foregoing gas turbine engines, the fan is operatively coupled to the geared architecture via a fan shaft, and the fan shaft is supported relative to the engine static structure by at least two bearings.

In a further embodiment of any of the foregoing gas turbine engines, the fan drive turbine has a pressure ratio greater than about five to one.

In a further embodiment of any of the foregoing gas turbine engines, the flex support includes a bellow, an annular mounting flange opposite the bellow and the first member is removably secured to the annular mounting flange.

In a further embodiment of any of the foregoing gas turbine engines, the first member and the second member are U-shaped brackets oriented in opposite radial positions.

In a further embodiment of any of the foregoing gas turbine engines, further includes a brace to strengthen the axial retention of the first member.

In a further embodiment of any of the foregoing gas turbine engines, at least one of the torque frame and the flex support includes at least one feature configured to limit annular rotation of at least one of the first and second members.

In a further embodiment of any of the foregoing gas turbine engines, the first and second members engage one another by axial movement in opposite directions.

A method of assembling a gas turbine engine in which a fan is driven by a speed reduction device according to an exemplary embodiment of this disclosure, among other possible things includes providing attachment features in a first structure and a second structure, securing first and second members respectively to the first and second structures, and installing the first structure onto an engine static structure and the speed reduction device onto the second structure such that the first and second members are engageable with one another during an extreme event.

In a further embodiment of any of the foregoing methods, the first structure is a flex support having a bellow and an annular mounting flange opposite the bellow, and the securing step includes mounting a lubrication manifold onto the second structure, and securing the second members over the lubrication manifold.

In a further embodiment of any of the foregoing methods, further includes the step of positioning the first and second members in a first angular position relative to one another, and rotating the first and second members from the first angular position to a second angular position against a brace.

In a further embodiment of any of the foregoing methods, the first and second members are arranged in an axially spaced relation to one another in an installed condition, and are configured to engage one another by moving axially in opposite directions.

A fan drive gear system for a gas turbine engine according to an exemplary embodiment of this disclosure, among other possible things includes a geared architecture configured to drive a fan, a first member secured to the geared architecture, and a second member configured for securing to a static structure and configured to cooperate with the first member to limit movement of the geared architecture relative to the static structure.

In a further embodiment of any of the foregoing fan drive gear systems, the first and second members are circumferentially aligned with one another and spaced apart from one another during a normal operating condition.

In a further embodiment of any of the foregoing fan drive gear systems, includes a flex support supporting the geared architecture relative to the static structure.

In a further embodiment of any of the foregoing fan drive gear systems, includes a support structure secured to the geared architecture and the flex support. The support structure includes at least one of a torque frame, a carrier, and a lubrication manifold, and the second member is removably secured to at least one of the torque frame, the carrier, and the lubrication manifold.

In a further embodiment of any of the foregoing fan drive gear systems, the geared architecture includes a plurality of gears supported within the carrier. The carrier is fixed against rotation by the torque frame. A central sun gear is operatively connected to the fan drive turbine, and a ring gear configured to drive the fan.

In a further embodiment of any of the foregoing an drive gear systems, the geared architecture has a speed reduction ratio greater than about 2.3:1.

A method of designing a gas turbine engine in which a fan is driven by a speed reduction device according to an exemplary embodiment of this disclosure, among other possible things includes defining attachment features in a first structure and a second structure, configuring first and second members for securement respectively to the first and second structures, and defining the first structure for attachment to an engine static structure and the second structure for attachment to the speed reduction device such that the first and second members are engageable with one another during an extreme event.

In a further embodiment of any of the foregoing methods, the first structure is defined as a flex support having a bellow and an annular mounting flange opposite the bellow, the second structure is configured for securement to a lubrication manifold and the second member is configured for securement over the lubrication manifold.

In a further embodiment of any of the foregoing methods, further includes configuring the first and second members to be positioned in a first angular position relative to one another and that rotating the first and second members from the first angular position to a second angular position abuts against a brace.

In a further embodiment of any of the foregoing methods, includes defining the first and second members to be arranged in an axially spaced relation to one another in an installed condition and to engage one another by moving axially in opposite directions during the extreme event.

BRIEF DESCRIPTION OF THE DRAWINGS

The disclosure can be further understood by reference to the following detailed description when considered in connection with the accompanying drawings wherein.

DETAILED DESCRIPTION

Figure 1:
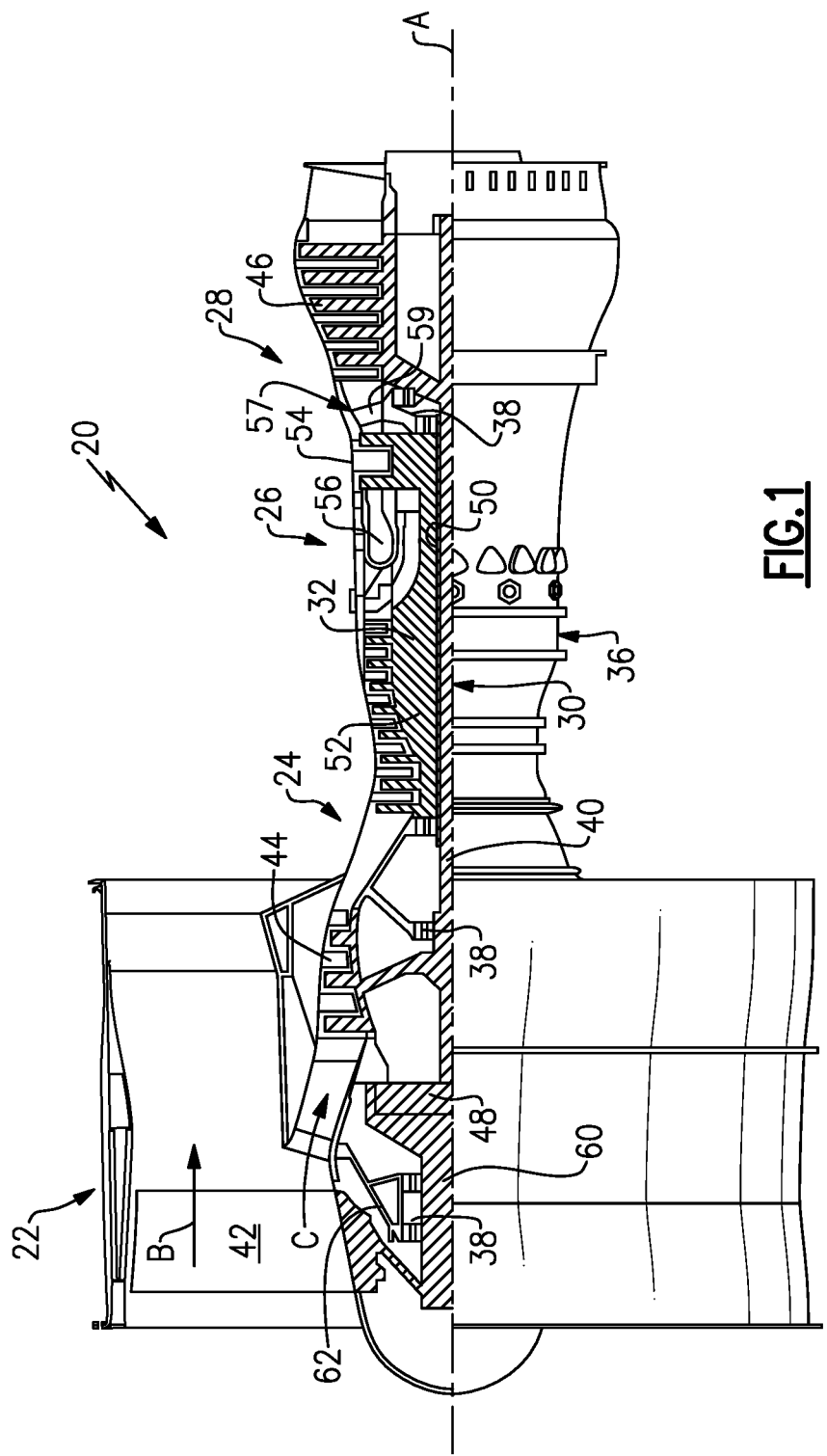
FIG. 1 shows a partial section view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The high speed spool 32 includes an outer shaft 50 that interconnects a high pressure (or second) compressor section 52 and high pressure (or second) turbine section 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine, In a further example, the engine 20 bypass ratio is greater than about six to one, with an example embodiment being greater than ten (10), the geared architecture 48 is an epicyclic gear train, such as a star gear system or other gear system, with a gear reduction ratio of greater than about 2.3:1 and the low pressure turbine 46 has a pressure ratio that is greater than about 5:1. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned per hour divided by lbf of thrust the engine produces at that minimum point. "Fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tambient\ deg\ R)/518.7)^{\wedge}0.5]$. The "Low corrected fan tip speed" as disclosed herein according to one non-limiting embodiment is less than about 1150 ft/second.

A fan shaft 60 interconnects the geared architecture 48 to the fan 42. The fan shaft 60 is supported by a pair of bearings 38, which are tapered roller bearings in one example. The bearings normally limit the axial travel of the fan shaft 60 and fan 42. During operation, the engine 20 may experience extreme events such as a fan blade loss or a failure of a fan shaft bearing support 62 supporting the bearings 38, which is part of the engine static structure 36. In such events, the fan 42 may undesirably tend to move axially forward relative to the other portions of the engine 20, such that the fan 42 and associated components could become disengaged from the engine 20.

Figure 2A:
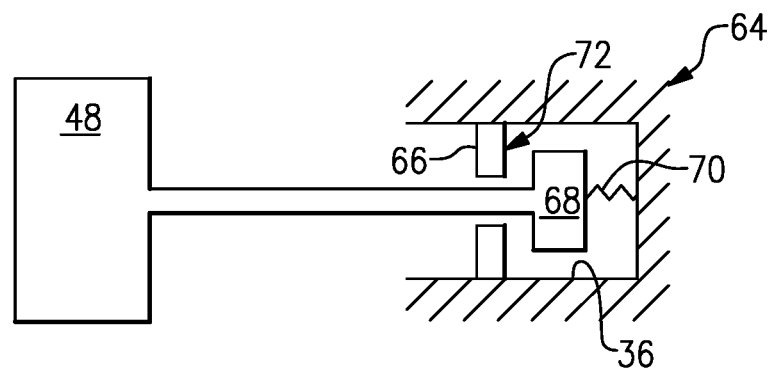
FIG. 2A depicts a highly schematic view of an example geared architecture support assembly of the FIG. 1 gas turbine engine during normal operation.
Figure 2B:
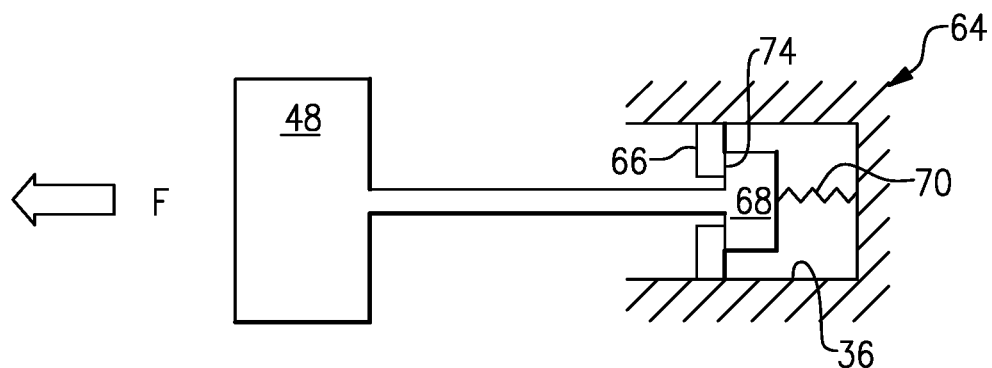
FIG. 2B depicts a highly schematic view of the FIG. 2A geared architecture support during an extreme event.

Referring to FIGS. 2A and 2B with continuing reference to FIG. 1, the example engine 20 includes other features that limit movement of the fan 42 during an extreme event, particularly if the bearings 38 or bearing support 62 are ineffective. For example, the example engine 20 includes a geared architecture support assembly 64 that limits forward movement of the fan 42 and the geared architecture 48 during an extreme event.

The example support assembly 64 includes at least a first member 66 and a second member 68. The first member 66 and the second member 68 are respectively operatively connected to the geared architecture 48 and the engine static structure 36, which functions as a mechanical ground. A compliant flex support 70 mounts the geared architecture 48 to the engine static structure 36. In the example, the first member 66 and the second member 68 are both arranged axially aft the geared architecture 48 relative to a direction of flow through the engine 20.

During normal engine operation, the first and second members 66, 68 are spaced apart from one another providing a gap 72, as shown in FIG. 2A. During an extreme event, such as a blade loss, the geared architecture 48 may experience an extreme load in the direction F due to the fan 42 rotating and attempting to move axially forward relative to other portions of the engine 20, as shown in FIG. 2B. In such an event, extreme movements of the geared architecture 48 are limited by the cooperation of the first and second members 66, 68 such that the loading in the direction F causes the first and second members 66, 68 to engage one another at area 74. This contact blocks movement of the geared architecture 48 axially forward. Since the geared architecture 48 is connected to the fan 42, limiting movement of the geared architecture 48 may prevent the fan 42 from moving axially forward the remaining attached portions of the engine 20.

Figure 3:
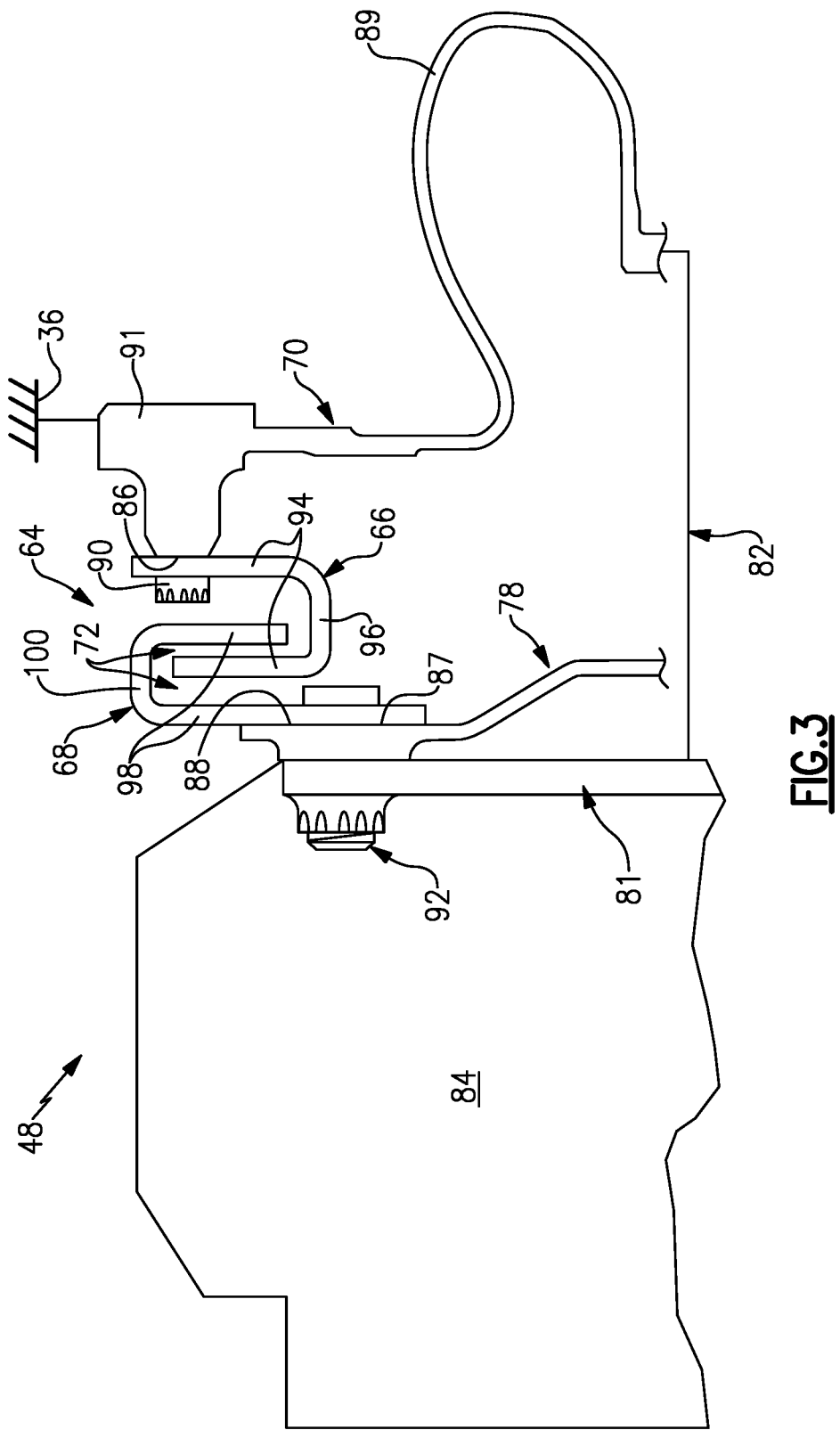
FIG. 3 is a cross-sectional view of a geared architecture and an example support assembly during normal operation.

One example support assembly 64 is illustrated schematically in FIG. 3. The flex support 70 is secured to a carrier 81 by a torque frame 82. A lubrication manifold 78 is arranged axially between the carrier 81 and the flex support 70. A geartrain 84 of the geared architecture 48 is supported by the torque frame 82. In one example, the geartrain 84 is a planetary gear arrangement in which planetary gears are supported by the carrier 81 and fixed against rotation by torque frame 82. A central sun gear receives rotational drive from the inner shaft 40 (FIG. 1) and a ring gear rotationally drives the fan 42 through the fan shaft 60 (FIG. 1).

The flex support 70 includes a bellow 89, which is provided by a wall that doubles back on itself to provide an undulation. The bellow 89 accommodates a relative movement of the geared architecture 48 relative to the engine static structure 36. An annular mounting flange 91 at an end opposite the bellow 89 is rotationally fixed relative to the engine static structure 36 by fasteners, splines and/or other means.

In the example illustrated, the support assembly 64 is provided by sets of first and second members 66, 68, which are removably secured respectively to the flex support 70 and the lubrication manifold 78. The first and second members 66, 68 are provided by U-shaped brackets oriented in opposite radial positions from one another to facilitate assembly. In the example, each set of members include five circumferentially spaced brackets.

The support assembly 64 may be retrofitted to existing gas turbine engines with geared architectures. In one example, first and second machined surfaces 86, 88 are respectively provided on the flex support 70 and a back side 87 of the lubrication manifold 78. If these machined surfaces are not provided on existing parts, the manufacturer can mill these surfaces, for example, as part of the retrofitting process. First fasteners 90 secure the first member 66 to the end 91. Second fasteners 92 secure the second member 68 to the lubrication manifold 78 and carrier 81. Existing geared architectures may be retrofitted by replacing the pre-existing fasteners that secure the lubrication manifold 78 to the carrier 81 with longer fasteners while reusing existing holes in the carrier 81 and the lubrication manifold 78. The first and second fasteners 90, 92 are threaded fasteners in one example.

Each first member 66 is provided by spaced apart legs 94 joined by a bend 96. Similarly, each second member 68 is provided by spaced apart legs 98 joined by a bend 100. The legs 94, 98 are axially spaced from one another to provide the gap 72 during normal operation.

Figure 4:
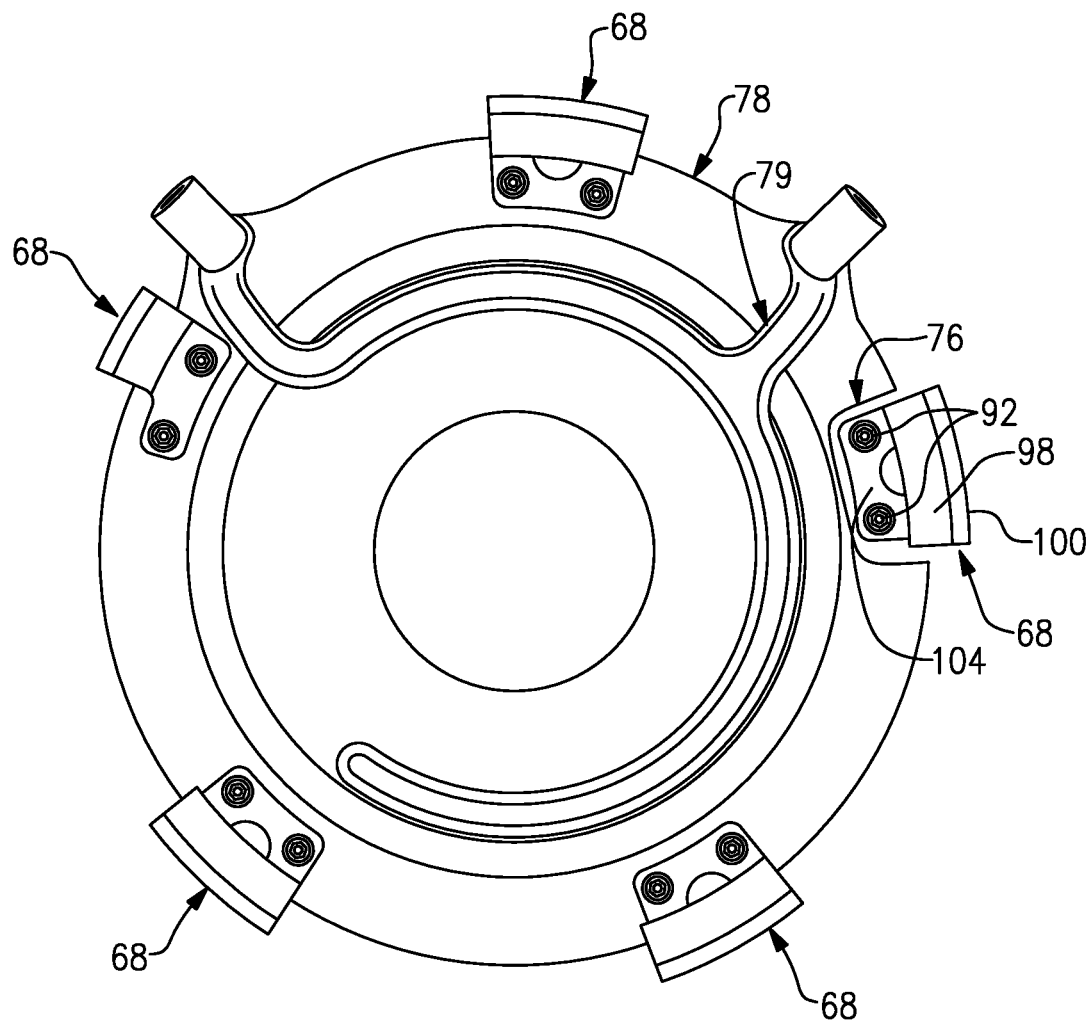
FIG. 4 is a rear view of an example oil manifold of the support assembly.
Figure 5:
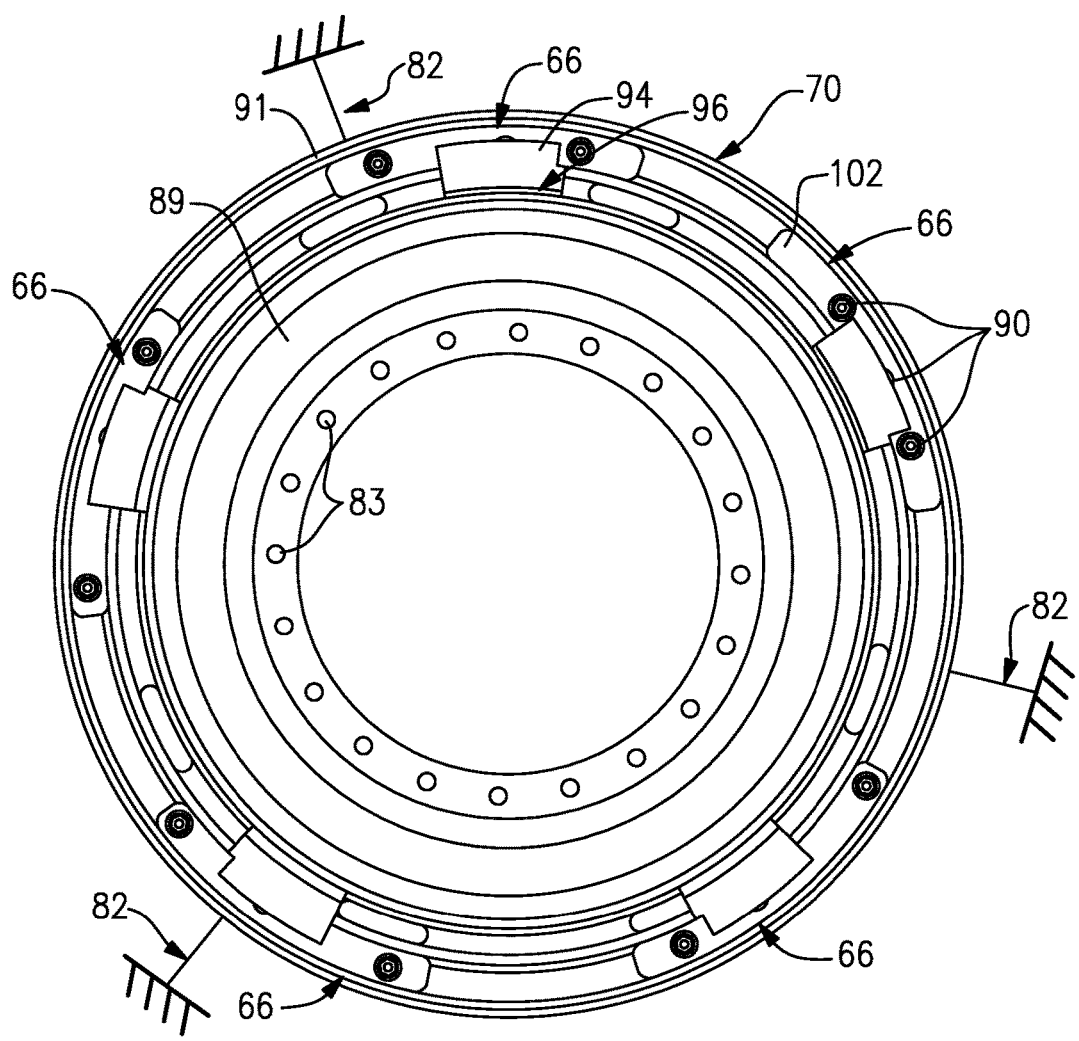
FIG. 5 is a front view of an example flex support of the support assembly.

Referring to FIG. 4, the lubrication manifold 78 may include integrally formed lubrication passages 79 that are cast into the lubrication manifold 78 to provide a unitary structure. The second members 68 include a second flange 104 supporting a leg 98 and secured to an outer periphery of the lubrication manifold. Alternately, the second member 68 could be secured directly to the carrier 81 through windows or scallops 76 in the lubrication manifold 78. Referring to FIG. 5, the first member 66 includes a first flange 102 supporting a leg 94 and secured to the annular mounting flange 91 of the flex support 70.

Figure 7:
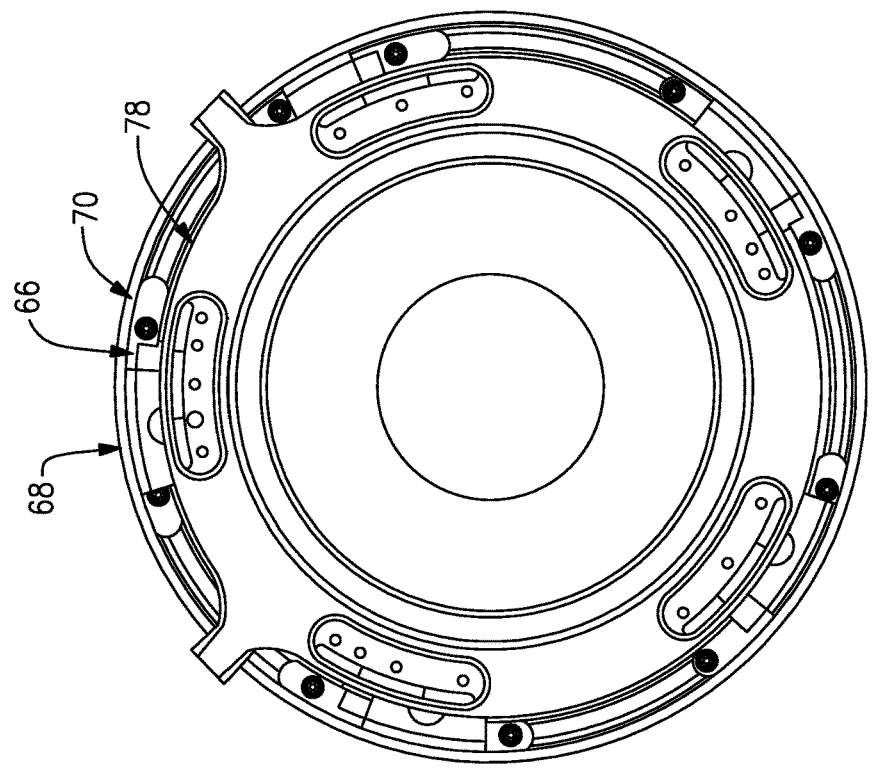
FIG. 7 is a front view of the oil manifold and flex support in a second angular position after assembly.
Figure 6A:
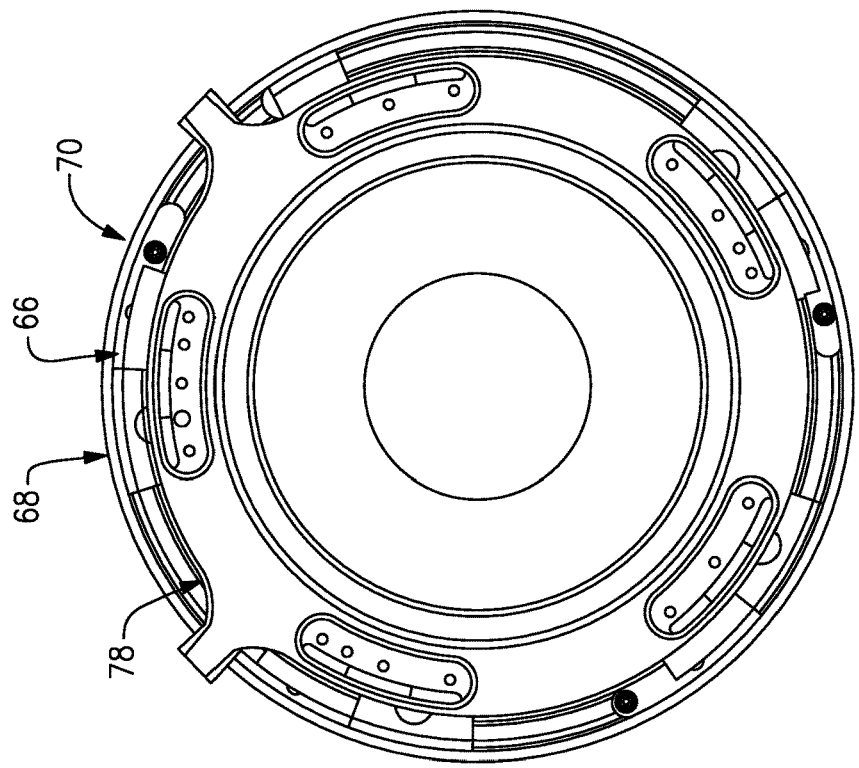
FIG. 6A is a front view of the oil manifold and flex support in a first angular position during assembly.
Figure 6B:
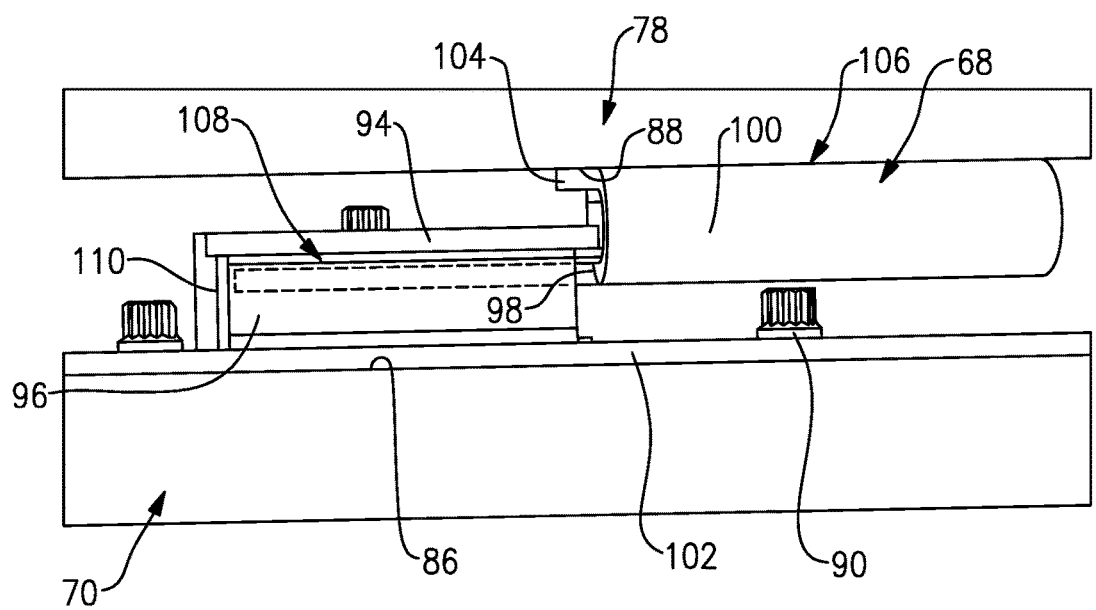
FIG. 6B is a top elevational view of the support assembly in the first angular position.

Referring to FIGS. 6A-7, with the first and second members 66, 68 respectively are secured to the flex support 70 and the lubrication manifold 78. The lubrication manifold 78 is arranged in a first angular position 106, illustrated in FIGS. 6A and 6B, such that the first and second members 66, 68 are circumferentially adjacent to one another but misaligned. The lubrication manifold 78 is rotated relative to the flex support 70 to circumferentially align the first and second members 66, 68 relative to one another in a second angular position 108. In this example, the first member 66 includes a brace 110 to strengthen the axial retention of the member. The annular rotation is limited by existing features, which are machined into the torque frame 82 and the flex support 70.

Features of the disclosed examples include a support structure that permits some movement of a geared architecture relative to other portions of an engine during normal operation of the engine, but limits movements during extreme events, particularly axially forward movements of the geared architecture.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
   a fan rotatable about an engine longitudinal axis;
   an engine static structure;
   a geared architecture to drive the fan and supported relative to the static structure; a fan drive turbine to drive the geared architecture;
   a plurality of circumferentially spaced first members secured to a carrier, the carrier supporting a portion of the geared architecture; and
   a plurality of circumferentially spaced second members secured to the engine static structure configured to cooperate with a corresponding one of the plurality of first members to limit movement of the geared architecture relative to the static structure, wherein the plurality of first members are and the plurality of second members are U-shaped in an axial cross-section in a direction common with the engine longitudinal axis, each of the U-shape of the plurality of first members extending axially and radially into a corresponding one of the U-shape of the plurality of the second members.

2. The gas turbine engine, of claim 1, wherein each of the plurality of first members and the plurality of second members are circumferentially aligned with one another and spaced apart from one another during a normal operating condition.

3. The gas turbine engine of claim 2, wherein each of the plurality at first members and the plurality of second members limit axial movement of the geared architecture relative to the engine static structure.

4. The gas turbine engine of claim 3, including a flex support supporting the geared architecture relative to the engine static structure.

5. The gas turbine engine of claim 4, including a support structure secured to the geared architecture and the flex support, wherein the support structure comprises at least one of a torque frame, the carrier, and a lubrication manifold, and the second members are removably secured to at least one of the torque frame, the carrier, and the lubrication manifold.

6. The gas turbine engine of claim 4, wherein the gas turbine engine has a bypass ratio greater than six to one.

7. The gas turbine engine of claim 6, wherein the geared architecture has a gear reduction ratio greater than 2.3:1.

8. The gas turbine engine of claim 7, wherein the geared architecture is a planetary gear train.

9. The gas turbine engine of claim 8, wherein the planetary gear train includes:
   a plurality of gears supported within the carrier, the carrier is fixed against rotation by the torque frame;
   a central sun gear is operatively connected to the fan drive turbine; and
   a ring gear configured to drive the fan.

10. The gas turbine engine of claim 9, wherein the fan is operatively coupled to the geared architecture via a fan shaft, and the fan shaft is supported relative to the engine static structure by at least two bearings.

11. The gas turbine engine of claim 10, wherein the fan drive turbine has a pressure ratio greater than five to one.

12. The gas turbine engine of claim 11, wherein the flex support includes a bellow, an annular mounting flange opposite the bellow and the plurality of first members are removably secured to the annular mounting flange.

13. The gas turbine engine of claim 12, further including a brace to strengthen the axial retention of each of the plurality of first members.

14. The gas turbine engine of claim 13, wherein at least one of the torque frame and the flex support includes at least one feature configured to limit annular rotation of at least one of each of the plurality of first members and the plurality of second members.

15. The gas turbine engine of claim 14, wherein each of the plurality of first members and each of the plurality of second members engage one another by axial movement in opposite directions.

16. A fan drive gear system for a gas turbine engine comprising:
   a geared architecture coupled to drive a fan about an engine longitudinal axis;
   a plurality of circumferentially spaced first members secured to a portion of the geared architecture; and
   a plurality of circumferentially spaced second members secured to an engine static structure configured to cooperate with a corresponding one of the plurality of first members to limit movement of the geared architecture relative to the engine static structure, wherein each of the plurality of first members and the plurality of second members are U-shaped in an axial cross-section in a direction common with the engine longitudinal axis and a corresponding one of the plurality of U-shaped first members extends axially and radially into a corresponding one of the plurality of U-shaped second members.

17. The fan drive gear system as recited in claim 16, wherein the plurality of first and the plurality of second members are circumferentially aligned with one another and spaced apart from one another during a normal operating condition.

18. The fan drive gear system as recited in claim 17, including a flex support supporting the geared architecture relative to the engine static structure.

19. The fan drive gear system as recited in claim 18, including a support structure secured to the geared architecture and the flex support, wherein the support structure comprises at least one of a torque frame, a carrier, and a lubrication manifold, and the second members are removably secured to at least one of the torque frame, the carrier, and the lubrication manifold.

20. The fan drive gear system as recited in claim 19, wherein the geared architecture includes:
   a plurality of gears supported within the carrier, the carrier is fixed against rotation by the torque frame;
   a central sun gear is operatively connected to a fan drive turbine; and
   a ring gear configured to drive the fan.

21. The fan drive gear system as recited in claim 16, wherein the geared architecture has a speed reduction ratio greater than 2.3:1.

* * * * *